US006985304B2

(12) United States Patent
Iijima

(10) Patent No.: US 6,985,304 B2
(45) Date of Patent: Jan. 10, 2006

(54) LENS SYSTEM AND CAMERA

(75) Inventor: Kenji Iijima, Suwa (JP)

(73) Assignee: Nittoh Kogaku K.K., (JP)

( * ) Notice: Subject to any disclaimer, the term of this patent is extended or adjusted under 35 U.S.C. 154(b) by 12 days.

(21) Appl. No.: 10/901,690

(22) Filed: Jul. 29, 2004

(65) Prior Publication Data

US 2005/0036210 A1 Feb. 17, 2005

(30) Foreign Application Priority Data

Jul. 31, 2003 (JP) ............................ 2003-284158

(51) Int. Cl.
*G02B 15/14* (2006.01)

(52) U.S. Cl. ...................................... 359/686; 359/676

(58) Field of Classification Search ................ 359/676, 359/686, 689

See application file for complete search history.

(56) References Cited

U.S. PATENT DOCUMENTS 5,442,484 A * 8/1995 Shikawa ..................... 359/651
5,523,888 A * 6/1996 Nishio ........................ 359/686
5,646,777 A * 7/1997 Ohshita ...................... 359/422
5,668,668 A * 9/1997 Shibayama et al. ......... 359/683
6,757,111 B2 * 6/2004 Takeuchi et al. ............ 359/784
6,781,768 B2 * 8/2004 Minefuji ..................... 359/689
6,809,878 B2 * 10/2004 Abe ........................... 359/680

FOREIGN PATENT DOCUMENTS

JP 04-217219 8/1992

* cited by examiner

*Primary Examiner*—Georgia Epps
*Assistant Examiner*—Darryl J. Collins
(74) *Attorney, Agent, or Firm*—Thompson Hine LLP

(57) ABSTRACT

A lens system comprising a first lens group with a negative refractive power, a second lens group with a positive refractive power, and a third lens group with a positive refractive power arranged in this order from an object side, wherein a focal length f2 of the second lens group, a focal length f3 of the third lens group and a radius of curvature Rm of an object side-surface of a lens that is closest to the object side in the second lens group satisfy following conditions $$0.30<Rm/f2<0.45$$

$$0.8<f2/f3<1.2.$$

The present invention provides a lens system with favorable telemetric characteristics for a digital camera and a sufficient aberration performance using a total of just seven lenses without using an aspherical lens.

5 Claims, 6 Drawing Sheets

Fig. 1
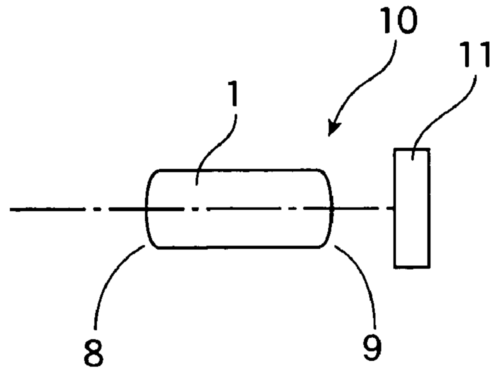
Fig. 2A
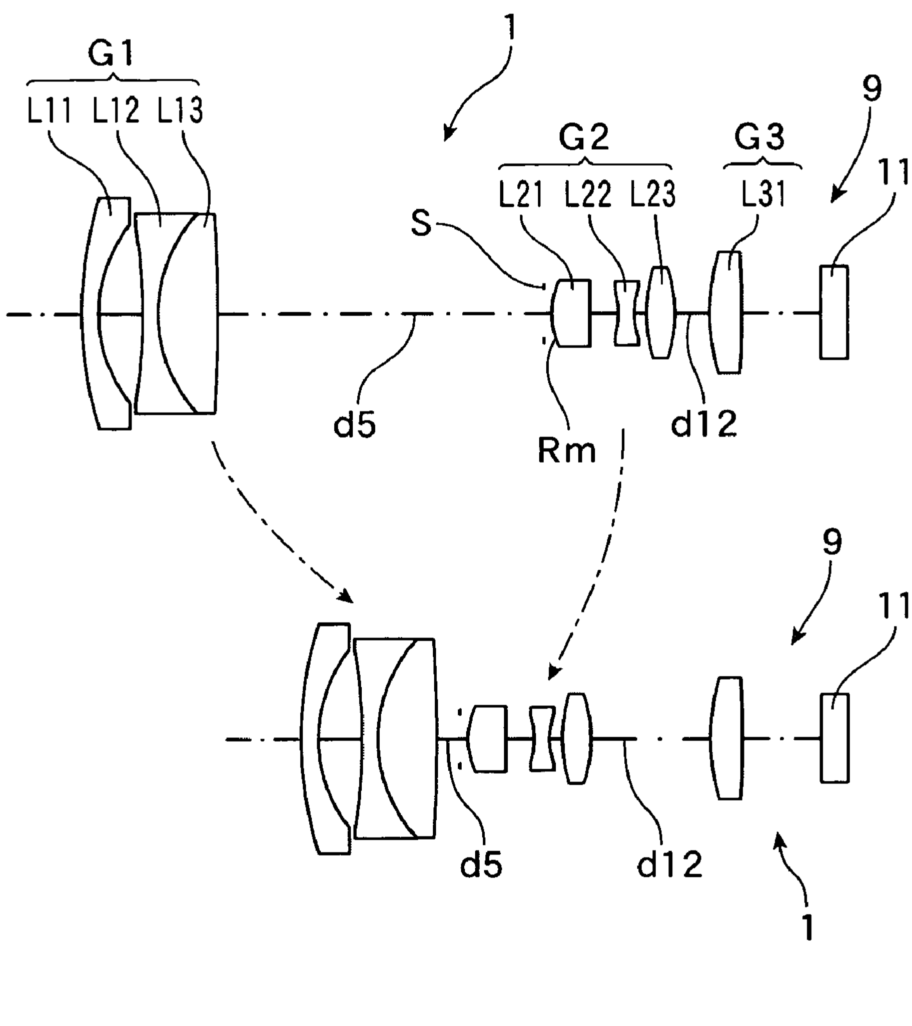
Fig. 2B

LENS SYSTEM AND CAMERA

BACKGROUND OF THE INVENTION

1. Technical Field

The present invention relates to a lens system suited to forming an image of an object on an opto-electric converting element, such as a CCD.

2. Description of the Related Art

In accordance with demand for reductions in the size and weight of digital cameras, small-scale zoom lenses for image pickup purposes have been provided. In Japanese Laid-Open Patent Publication No. H04-217219, a zoom lens that has a first lens group with negative refractive power, a second lens group with positive refractive power, and a third lens group with positive refractive power arranged in this order from the object side is disclosed. In the lens system magnification is carried out by moving the first lens group and the second lens group. In the case of a digital still camera (a so-called "digital camera") that records images using an opto-electric converting element such as a CCD, the dynamic range is narrow and the recorded images are still images. Therefore, compared to a video camera lens and a lens for silver halide photography, in accordance with the characteristics of a CCD, the lens system is designed with the exit pupil position set sufficiently distant from the imaging surface and it is preferable for the image side of the lens system to be made telecentric or to have similar characteristics.

To make the image pickup side telecentric, the retrofocus-type construction with negative-positive-positive powers disclosed by Japanese Laid-Open Patent Publication No. H04-217219 is suitable. However, with the lens system disclosed by Japanese Laid-Open Patent Publication No. H04-217219, although a sufficient image forming performance is achieved, the construction includes as many as ten lenses and the overall length of the lens system is long. The telecentric performance is also insufficient. This is because in order to achieve a sufficient telecentric performance, it is necessary to use a design where the exit pupil position is sufficiently distant from the imaging surface of the element. To do so, it is necessary to sufficiently raise the negative power of the first lens group and to reduce the positive power of the second lens group, but if the negative power of the first lens group is excessively raised, it becomes no longer possible to correct distortion, and if the positive power of the second lens group is excessively reduced, the magnifying action is reduced, the lens length is increased, and the correction of aberration by the second lens group becomes insufficient. Accordingly, the power of the first lens group is suppressed to an extent, the power of the second lens group is maintained, and a large number of lenses are disposed for correcting aberration. Such a design leads the lens system with insufficient telecentric performance and not compact that dose not suit for a digital camera.

By using aspherical lenses, it is possible to reduce the number of lenses and to improve aberration. A variety of aspherical lenses are available, such as molded glass lenses, hybrid lenses, and plastic lenses, but the desired performance cannot be achieved unless errors such as surface precision and eccentricity are small. Precise aspherical lenses are expensive, so that even if the overall number of lenses is reduced, the manufacturing cost of a lens system cannot be reduced. Plastic lenses that are relatively inexpensive also exhibit a high temperature dependency, so that there is the further problem of it being difficult to maintain a uniform performance. In addition, since the effects of the precision of the lenses themselves, environmental effects due to temperature and the like, and effects such as the assembly precision of the lens system are complexly intertwined, it is difficult to achieve the designed performance in an actual lens system that uses aspherical lenses.

For this reason, it is an object of the present invention to provide a zoom lens with favorable aberration performance by combining a small number of lenses, even if an aspherical lens is not used.

SUMMARY OF THE INVENTION

As described above, in a retrofocus-type lens system with negative-positive-positive refractive powers, to obtain sufficient telecentric characteristics, it is necessary to sufficiently increase the negative refractive power of the first lens group and to reduce the positive refractive power of the second lens group. However, if the curvature of the lens surface closest to the object side in the second lens group that faces the first lens group with the high negative power is not sufficiently large, i.e., the radius of curvature Rm is not sufficiently small, it is not possible to correct the aberration caused by the first lens group with the high negative power. That is, if the radius of curvature Rm of the first lens surface of the second lens group on the object side is so large, it is necessary to raise the power of the other lenses in the second lens group even if an unbalance that decreases ability of correcting aberration may occur.

If the radius of curvature Rm of the first lens surface of the second lens group on the object side is too large, little spherical aberration caused by this surface cannot correct the spherical aberration caused by the other surfaces sufficiently. Also, if the refractive power of the second lens group is too small, it becomes difficult to correct not only the aberration caused by the first lens group but also the aberration caused by the third lens group. Especially, in a zoom lens system, the small refractive power of the second lens group reduces the magnifying action, and it leads to the further problem of the lens length becoming too long.

Conversely, if the radius of curvature Rm of the first lens surface of the second lens group on the object side is too small, excessive spherical aberration caused by the first lens surface may not be completely corrected by the other surfaces. However, as mentioned above, if the second lens group does not have a certain degree of refractive power, it is not possible to sufficiently correct the aberration of the lens system as a whole. Therefore, the radius of curvature Rm of the first lens surface of the second lens group shall be small within some range.

The present invention identifies problems between the refractive power of the second lens group and the radius of curvature of the closest lens surface to the object side in the second lens group, and provides the relationship between the refractive power of the second lens group and the radius of curvature of the closest lens surface to the object side in the second lens group to solve the problems. The present invention also provides a lens system and also a zoom lens system that have sufficient aberration performance with a construction including a low number of lenses, without necessarily using an aspherical lens.

The lens system according to the present invention includes a first lens group with a negative refractive power, a second lens group with a positive refractive power, and a third lens group with a positive refractive power arranged in this order from an object side, wherein a focal length f2 of the second lens group, a focal length f3 of the third lens group, and a radius of curvature Rm of an object side-surface of a closest lens to the object side in the second lens group satisfy the following conditions (A) and (B).

$$0.30<Rm/f2<0.45 \quad (A)$$

$$0.8<f2/f3<1.2 \quad (B)$$

In the lens system according to the present invention, the respective refractive powers of the second lens group and the third lens group are around equal, so that the amount of aberration to be corrected by the second lens group is reduced. If a high aberration correcting ability is not required for the second lens group, the favorable range between the focal distance f2 and the radius of curvature Rm becomes comparatively wide. If the lower limit of the condition (A) is exceeded, the aberration caused by the lens surface closest to the object side cannot be corrected by the other lenses sufficiently. While if the upper limit of the condition (A) is exceeded, the aberration caused by the lens surface closest to the object side is insufficient, so that the aberration caused by other lenses cannot be corrected sufficiently.

By setting the refractive power of the second lens group and setting a range for the radius of curvature of the closest lens surface to the object side in the second lens group with respect to the refractive power of the second lens group according to this invention, it is possible to provide a lens system that is constructed with around seven lenses as shown in the following embodiments and that can favorably correct aberration even if an aspherical lens is not used. This does not mean that the present invention excludes lens systems that use aspherical lenses, but since it is possible to achieve sufficient image forming performance for actual use with a lens system composed of a low number of lenses without using an aspherical lens, there is no longer a positive reason for using an aspherical lens, and it is possible to obtain a low-cost lens system that can favorably correct aberration and has stable image forming performance.

In addition, the lens system according to the present invention has sufficient image forming performance for zooming, and can be provided as a zoom lens system in which the spatial distance between the first lens group and the second lens group decreases and the spatial distance between the second lens group and the third lens group increases when magnifying from a wide-angle end to a telephoto end.

A lens system according to the present invention includes a specific aspect comprising the first lens group consists of three lenses, in order from the object side, a negative meniscus lens that is convex on the object side, a negative lens and a positive lens; the second lens group consists of three lenses, in order from the object side, a positive lens, a negative lens and a positive lens; and the third lens group consists of a single positive lens. By the lens system having a seven-lens construction, a compact and high performance lens system can be provided. In a digital camera that includes the lens system according to the present invention and an opto-electric converting element for receiving an image formed by the lens system, it is possible to combine a compact and low-cost lens system with a high-resolution CCD so that a camera that is low-cost, compact and picking up clear images can be provided.

The negative lens and positive lens of the first lens group may be a single cemented lens. By using a cemented lens, it is possible to eradicate the spatial distance between the lenses, which reduces the number of components when assembling the first lens group, so that the effects of the precision of assembly and the components themselves can be reduced and a more compact lens system with favorable image forming performance can be provided at low cost.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings:

FIG. 1 shows an arrangement of a digital camera that uses a lens system according to the present invention;

FIGS. 2A and 2B show an arrangement of a lens system of the first embodiment of the present invention, with FIG. 2A showing the lens arrangement at a wide-angle end and FIG. 2B showing the lens arrangement at a telephoto end;

DESCRIPTION OF THE PREFERRED EMBODIMENTS

First Embodiment

Figure 3A:
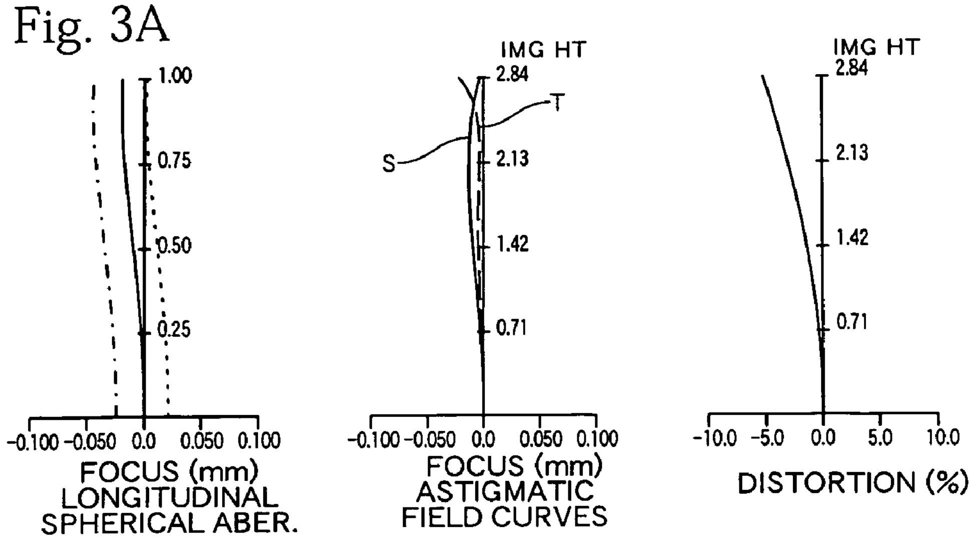
FIGS. 3A to 3C show longitudinal aberrations of the lens system of the first embodiment, with FIG. 3A showing aberrations at the wide-angle end, FIG. 3B showing aberrations at an intermediate position, and FIG. 3C showing aberrations at the telephoto end.

FIG. 1 shows a digital camera 10 including a lens system 1 according to the present invention, while FIG. 2 shows the detailed construction of the lens system 1 of the first embodiment of the present invention. The digital camera 10 includes a CCD 11 that is disposed on the image side of the lens system 1. CCD 11 is a one of the opto-electric converting element (image pickup element) that can receive an image formed by the lens system and convert the image information of the object formed on the CCD 11 by the lens system 1 to a digital signal for recording the information onto a suitable recording medium or supplying the information via a computer network, such as the Internet, and others. The lens system 1 of the present embodiment is a zoom lens system. FIG. 2A shows the lens arrangement at the wide-angle end (a short focus end) and FIG. 2B shows the lens arrangement at the telephoto end (a long focus end). The lens system 1 of the present embodiment is composed of seven lenses that are divided into three lens groups G1, G2, and G3 arranged in this order from an object side 8 towards the image side 9 on which the focal plane of the CCD 11 is disposed.

The first lens group G1 that is closest to the object side 8 has an overall negative refractive power, and in order from the object side 8 is composed of three lenses: a negative meniscus lens L11 that is convex on the object side 8; a negative bi-concave lens L12; and a positive bi-convex lens L13. The negative lens L12 and the positive lens L13 are composed of a cemented lens.

The second lens group G2 has an overall positive refractive power, and in order from the object side 8 is composed of a positive bi-convex lens L21, a negative bi-concave lens L22, and a positive bi-convex lens L23. A stop S that moves together with the second lens group G2 is provided on the object side 8 of the second lens group G2.

The third lens G3 that is closest to the image side 9 has an overall positive refractive power and is composed of a positive bi-convex lens L31. The third lens group G3 does not move during magnification from the wide-angle end to the telephoto end, and the first lens group G1 and the second lens group G2 move so as to reduce the gap d5 between them and the second lens group G2 moves so as to increase the gap d12 between the second lens group G2 and the third lens group G3.

In the lens data shown below, "No." represents the number of the lens surface counting in order from the object side 8, "Ri" represents the radius of curvature (mm) of each lens arranged in order from the object side 8, "Di" represents the distance (mm) between the respective lens surfaces arranged in order from the object side 8, "nd" represents the refractive index (d line) of each lens, and "vd" represents the Abbe number (d line) of each lens. The distance d5 is the gap (mm) between the first lens group G1 and the second lens group G2 and the distance D12 is the gap (mm) between the second lens group G2 and the third lens group G3. Also, the expression "Flat" indicates a flat surface. The same expressions are used in the following embodiments.

Lens Data (No. 1)

| No. | Ri | Di | nd | vd | |
|---|---|---|---|---|---|
| 1 | 22.753 | 1.20 | 1.83400 | 37.34 | lens L11 |
| 2 | 8.014 | 3.10 | | | |
| 3 | −30.623 | 1.00 | 1.63854 | 55.45 | lens L12 |
| 4 | 8.321 | 4.20 | 1.83400 | 37.34 | lens L13 |
| 5 | −87.838 | d5 (changeable) | | | |
| 6 | Flat | 0.50 | | | stop S |
| 7 | 5.355 (Rm) | 2.60 | 1.74330 | 49.22 | lens L21 |
| 8 | −26.306 | 1.80 | | | |
| 9 | −4.124 | 1.00 | 1.84666 | 23.78 | lens L22 |
| 10 | 8.249 | 0.60 | | | |
| 11 | −165.952 | 1.80 | 1.74330 | 49.22 | lens L23 |
| 12 | −5.217 | d12 (changeable) | | | |
| 13 | 21.791 | 2.30 | 1.78590 | 43.93 | lens L31 |
| 14 | −20.078 | | | | |

Various coefficients during zooming are as follows.

| condition | Wide angle | Medium | Telephoto |
|---|---|---|---|
| Focal lengths f (mm) | 4.98 | 7.04 | 9.96 |
| Back-focus length fb (mm) | 5.00 | 5.00 | 5.00 |

-continued

| condition | Wide angle | Medium | Telephoto |
|---|---|---|---|
| Length d5 (mm) | 18.40 | 8.48 | 1.50 |
| Length d12 (mm) | 1.50 | 3.81 | 7.12 |

The focal length of the first lens group G1 f1 (mm): −21.05
The focal length of the second lens group G2 f2 (mm): 13.74
The focal length of the third lens group G3 f3 (mm): 13.63
Rm/f2 = 0.39
f2/f3 = 1.01

The lens system 1 of the present embodiment is a retrofocus-type lens system having negative-positive-positive refractive powers in this order from the object side 8 and satisfies the conditions (A) and (B) given above. That is, the second lens group G2 and the third lens group G3 have approximately equal power, and the value of the radius of curvature R7 (Rm) of the lens surface on the object side 8 of the lens L4, which is the closest lens to the object side 8 out of the second lens group G2, with respect to the focal distance f2 of the second lens group G2 is in an optimal range for correcting aberration. Also, the lens system functions as a zoom lens with a zoom ratio of two, and is a compact zoom lens that is composed of a total of seven lenses and has an overall length of 45.0 mm at the wide-angle end.

Figure 3B:
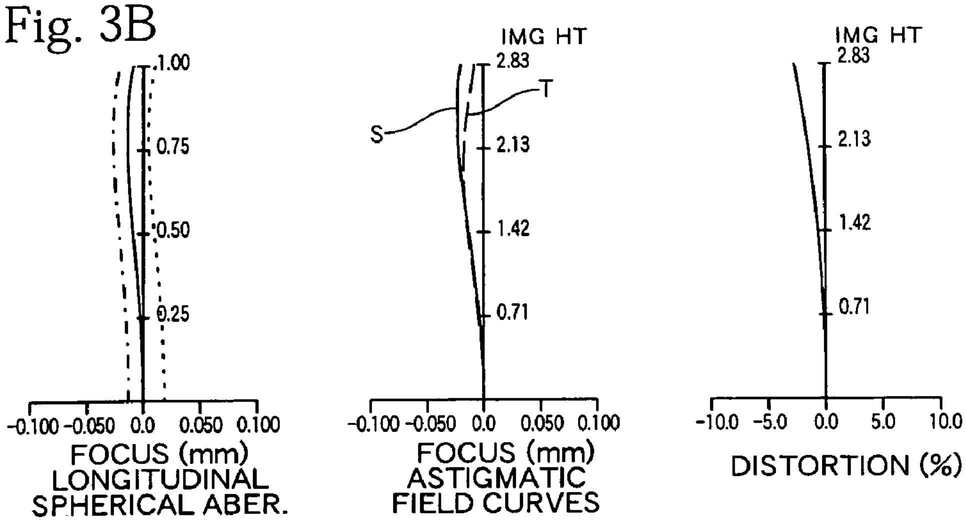
Figure 3C:
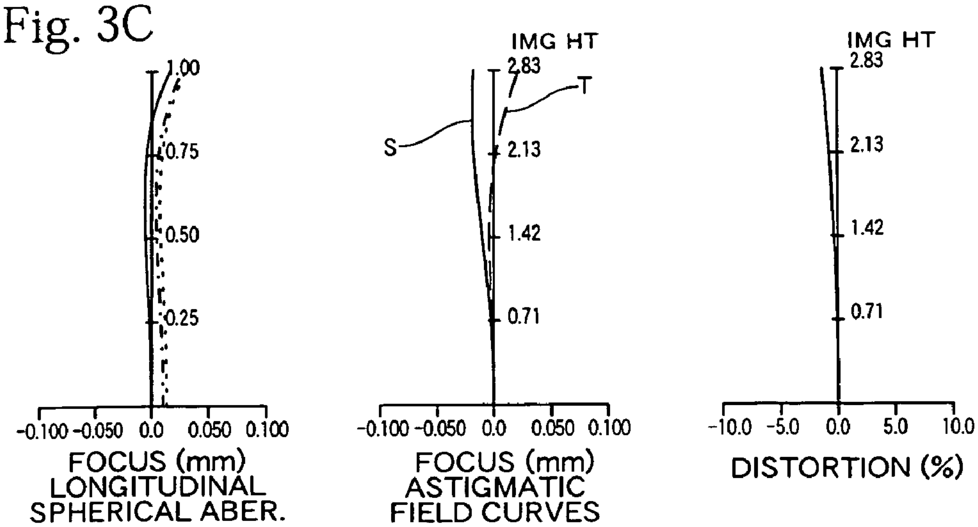

FIGS. 3A to 3C show the spherical aberration, astigmatism, and distortion of the lens system 1 at the wide-angle end (FIG. 3A), the telephoto end (FIG. 3C), and an intermediate position (FIG. 3B). Values of the spherical aberration are shown for the respective wavelengths 656.28 nm (broken line), 587.56 nm (solid line), and 486.13 nm (dot-dash line). As can be understood from these figures, from the wide-angle end to the telephoto end, spherical aberration of the lens system 1 of the present embodiment is sufficiently suppressed to a range of ±0.03 mm or below, and in the lens system 1 that has a seven-lens construction, a superior aberration performance to the conventional lens system that has ten-lens construction is achieved even though no aspherical lens is used.

The lens system 1 of the present embodiment is a retrofocus-type zoom lens with first, second, and third lens groups with respectively negative, positive, and positive refractive powers, has high telemetric characteristics on the image side, and is also a lens system in which aberration is corrected extremely favorably with a compact construction with a total of seven lenses without using an aspherical lens. This means that the lens system 1 of the present embodiment is a high-performance, low-cost, compact zoom lens system, and by combining the lens system 1 with a high-definition CCD 11 to construct the digital camera 10, it is possible to provide a compact, high-definition digital camera that makes full use of the high performance of CCD 11 to produce clear, high-resolution images.

Second Embodiment

Figure 4A:
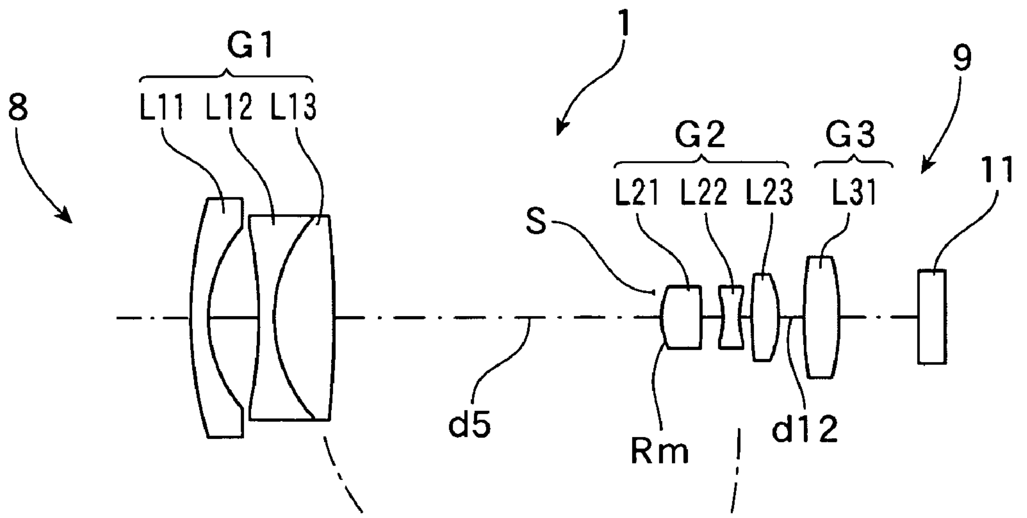
FIGS. 4A and 4B show an arrangement of a lens system of the second embodiment of the present invention, with FIG. 4A showing the lens arrangement at a wide-angle end and FIG. 4B showing the lens arrangement at a telephoto end.
Figure 4B:
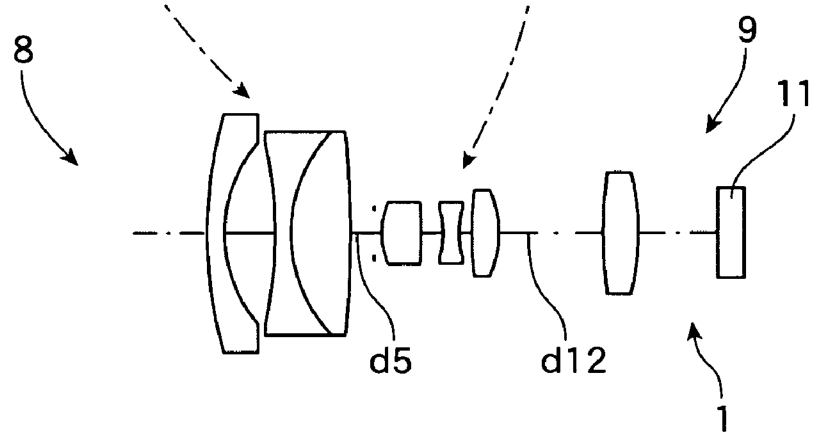

FIG. 4A shows the lens arrangement of a different lens system 1 according to the present invention at the wide-angle end, while FIG. 4B shows the lens arrangement at the telephoto end. From the object side 8 towards the image side 9, the lens system 1 of the present embodiment includes a first lens group G1 with negative refractive power, a second lens group G2 with positive refractive power, and a third lens group G3 with positive refractive power. The lens compositions of the respective lens groups are the same as the construction of the first embodiment described above, with the first lens group G1 being composed of the lenses L11 to L13, the second lens group G2 being composed of the lenses L21 to L23, and the third lens group G3 being composed of the lens L31, so that the lens system 1 is composed of a total of seven lenses. The lens data of the second embodiment is as follows.

Lens Data (No. 2)

| No. | Ri | Di | nd | vd | |
|---|---|---|---|---|---|
| 1 | 27.972 | 1.10 | 1.83400 | 37.34 | lens L11 |
| 2 | 9.027 | 3.20 | | | |
| 3 | −27.410 | 1.00 | 1.62280 | 56.91 | lens L12 |
| 4 | 9.523 | 3.80 | 1.83400 | 37.34 | lens L13 |
| 5 | −66.517 | d5 (changeable) | | | |
| 6 | Flat | 0.50 | | | stop S |
| 7 | 4.989 | 2.50(Rm) | 1.74330 | 49.22 | lens L21 |
| 8 | −26.736 | 1.40 | | | |
| 9 | −4.851 | 1.00 | 1.80518 | 25.46 | lens L22 |
| 10 | 5.714 | 0.80 | | | |
| 11 | 25.864 | 1.70 | 1.74330 | 49.22 | lens L23 |
| 12 | −7.044 | d12 (changeable) | | | |
| 13 | 27.223 | 2.20 | 1.74330 | 49.22 | lens L31 |
| 14 | −16.557 | | | | |

Various coefficients during zooming are as follows.

| conditions | Wide angle | Medium | Telephoto |
|---|---|---|---|
| Focal lengths f (mm) | 5.11 | 7.23 | 10.22 |
| Back-focus length fb (mm) | 5.00 | 5.00 | 5.00 |
| Length d5 (mm) | 20.22 | 9.23 | 1.50 |
| Length d12 (mm) | 1.57 | 3.64 | 6.57 |

The focal length of the first lens group G1 f1 (mm): −23.06
The focal length of the second lens group G2 f2 (mm): 13.65
The focal length of the third lens group G3 f3 (mm): 14.15
Rm/f2 = 0.37
f2/f3 = 0.96

The lens system 1 of the present embodiment is also a lens system in which negative-positive-positive refractive powers are arranged in this order from the object side 8, and satisfies the conditions (A) and (B) given above. To do so, the second lens group G2 and the third lens group G3 have approximately equal power, and the value of the radius of curvature R7 (Rm) of the lens surface on the object side 8 of the lens L4, which is the closest lens to the object side 8 out of the second lens group G2, with respect to the focal distance f2 of the second lens group G2 is in an optimal range for correcting aberration. Also, the lens system functions as a zoom lens with a zoom ratio of two, and is a compact, bright zoom lens that is composed of seven lenses and has an overall length of 46.0 mm at the wide-angle end.

Figure 5A:
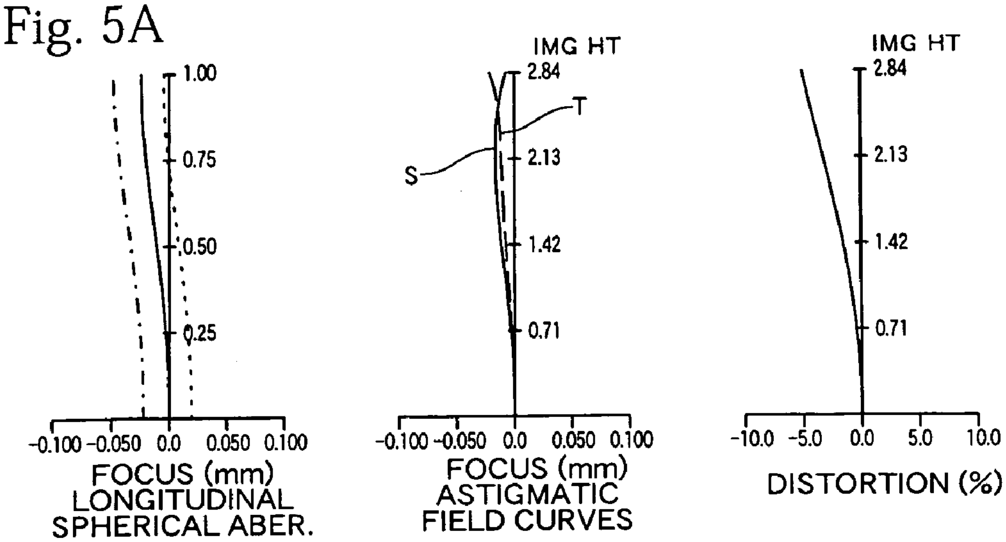
FIGS. 5A to 5C are longitudinal aberrations of the lens system of the second embodiment, with FIG. 4A showing aberrations at the wide-angle end, FIG. 4B showing aberrations at an intermediate position, and FIG. 4C showing aberrations at the telephoto end.
Figure 5B:
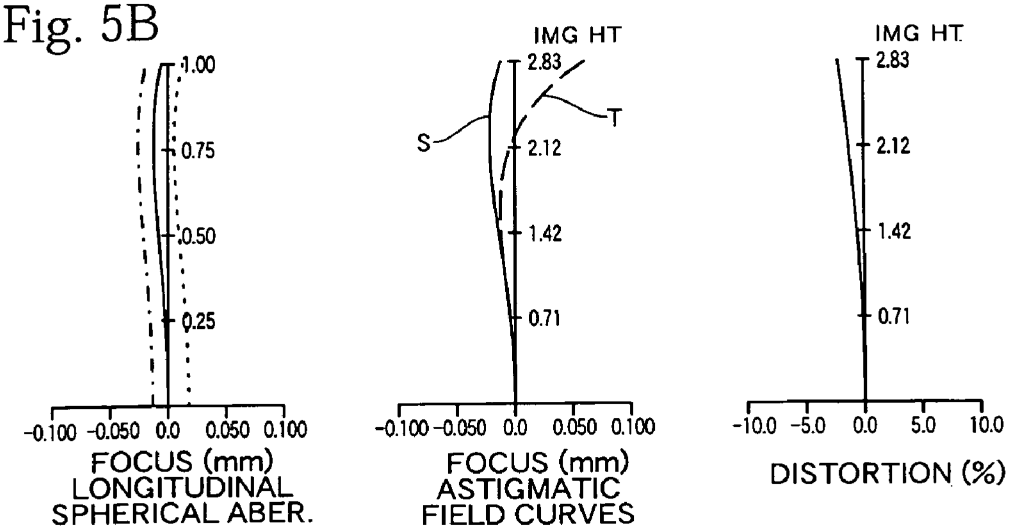
Figure 5C:
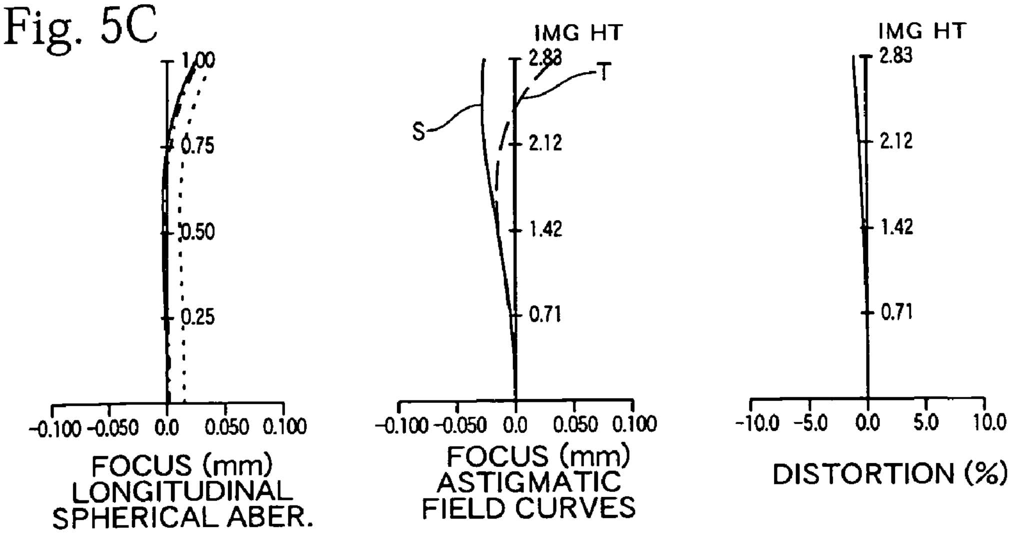

FIGS. 5A to 5C show the spherical aberration, astigmatism, and distortion of the lens system 1 at the wide-angle end (FIG. 5A), the telephoto end (FIG. 5C), and an intermediate position (FIG. 5B). As shown in these figures, from the wide-angle end to the telephoto end, spherical aberration of the lens system 1 of the present embodiment is sufficiently suppressed to a range of ±0.03 mm or below, and in the lens system 1 that has a seven-lens construction, a superior aberration performance to the conventional lens system that has a ten-lens construction is achieved even though no aspherical lens is used. Accordingly, the lens system 1 of the present embodiment also has high telemetric characteristics on the image pickup side, is suited to a digital camera in which an opto-electric converting element for picking up an image such as a CCD is used and is also a lens system which corrects aberration extremely favorably and has a compact overall construction with a total of seven lenses without using an aspherical lens.

Third Embodiment

Figure 6A:
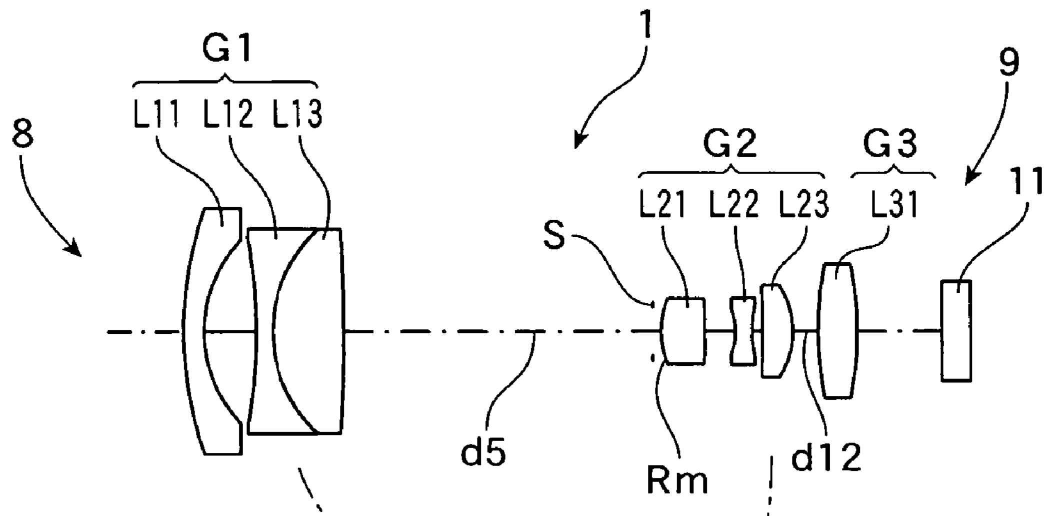
FIGS. 6A and 6B show an arrangement of the lens system of the third embodiment of the present invention, with FIG. 6A showing the lens arrangement at a wide-angle end and FIG. 6B showing the lens arrangement at a telephoto end.
Figure 6B:
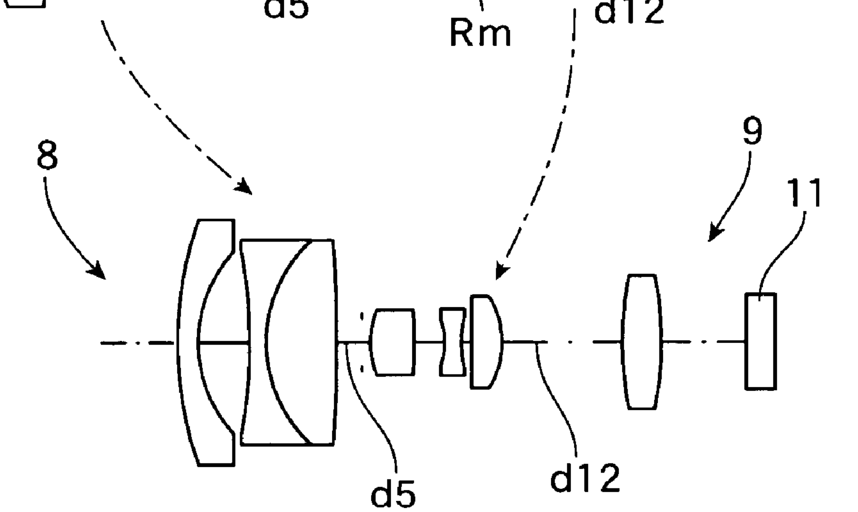

FIG. 6A shows the lens arrangement of a different lens system 1 according to the present invention at the wide-angle end, while FIG. 6B shows the lens arrangement at the telephoto end. From the object side 8 towards the image pickup side 9, the lens system 1 of the present embodiment also includes a first lens group G1 with negative refractive power, a second lens group G2 with positive refractive power, and a third lens group G3 with positive refractive power. The lens compositions of the respective lens groups are the same as the construction of the first embodiment described above, so that the lens system 1 is composed of a total of seven lenses. The lens data of the third embodiment is as follows.

Lens Data (No. 3)

| No. | Ri | Di | nd | vd | |
|---|---|---|---|---|---|
| 1 | 25.221 | 1.10 | 1.83400 | 37.34 | lens L11 |
| 2 | 9.438 | 2.80 | | | |
| 3 | −35.638 | 1.00 | 1.63854 | 55.45 | lens L12 |
| 4 | 9.548 | 3.80 | 1.83400 | 37.34 | lens L13 |
| 5 | −100.053 | d5 (changeable) | | | |
| 6 | Flat | 0.50 | | | stop S |
| 7 | 5.156 | 2.40 | 1.74330 | 49.22 | lens L21 |
| 8 | −127.076 | 1.80 | | | |
| 9 | −5.504 | 1.00 | 1.78472 | 25.72 | lens L22 |
| 10 | 5.050 | 0.80 | | | |
| 11 | 10.318 | 1.80 | 1.74330 | 49.22 | lens L23 |
| 12 | −9.167 | d12 (changeable) | | | |
| 13 | 14.199 | 2.00 | 1.74330 | 49.22 | lens L31 |
| 14 | −62.250 | | | | |

Various coefficients during zooming are as follows.

| conditions | Wide angle | Medium | Telephoto |
|---|---|---|---|
| Focal lengths f (mm) | 5.90 | 8.34 | 11.80 |
| Back-focus length fb (mm) | 5.00 | 5.00 | 5.00 |
| Length d5 (mm) | 20.81 | 9.50 | 1.50 |
| Length d12 (mm) | 2.18 | 4.40 | 7.57 |

The focal length of the first lens group G1 f1 (mm): −25.59
The focal length of the second lens group G2 f2 (mm): 14.40
The focal length of the third lens group G3 f3 (mm): 15.73
Rm/f2 = 0.36
f2/f3 = 0.92

The lens system 1 of the present embodiment is also a lens system in which negative-positive-positive refractive powers are arranged in this order from the object side 8, and is a construction that is suited to correcting aberration and satisfies the conditions (A) and (B) given above. Also, the lens system functions as a zoom lens with a zoom ratio of two, and is a compact zoom lens that is composed of a total of seven lenses and has an overall length of 47.0 mm at the wide-angle end.

Figure 7A:
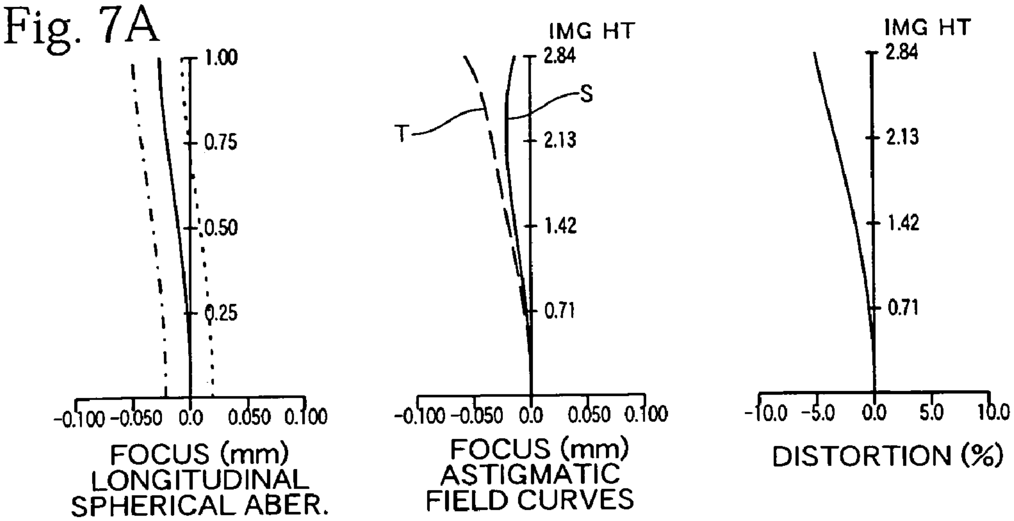
FIGS. 7A to 7C are longitudinal aberrations of the lens system of the third embodiment, with FIG. 7A showing aberrations at the wide-angle end, FIG. 7B showing aberrations at an intermediate position, and FIG. 7C showing aberrations at the telephoto end.
Figure 7B:
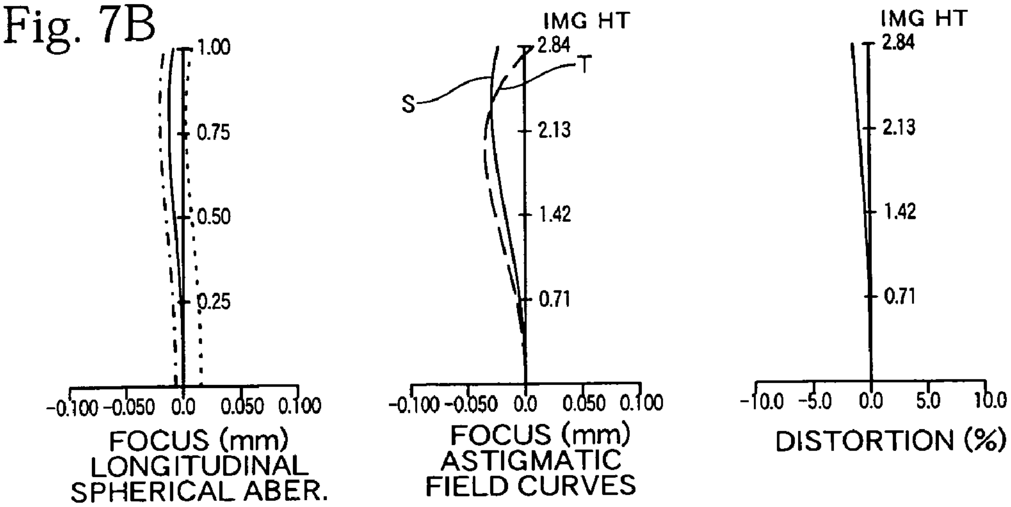
Figure 7C:
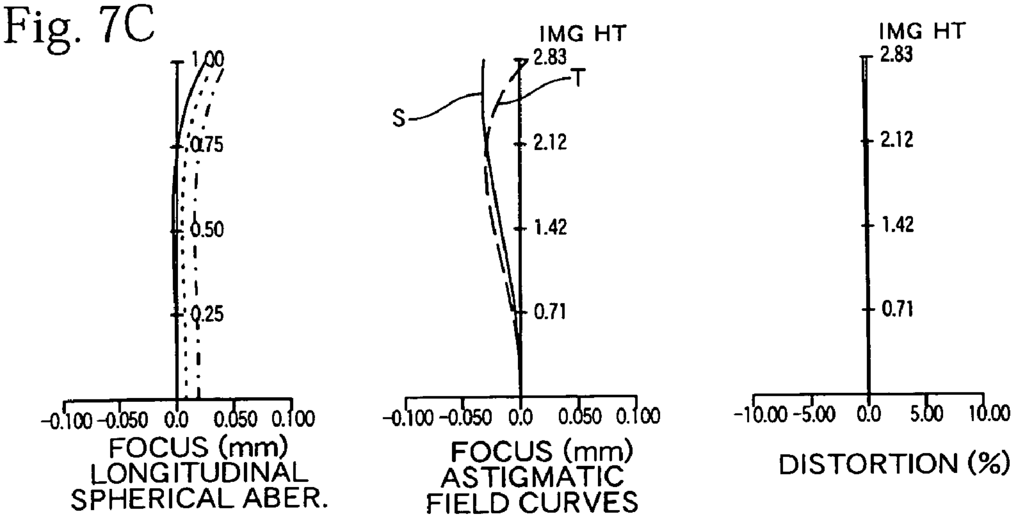

FIGS. 7A to 7C show the spherical aberration, astigmatism, and distortion of the lens system 1 at the wide-angle end (FIG. 7A), the telephoto end (FIG. 7C), and an intermediate position (FIG. 7B). As can be understood from these drawings, from the wide-angle end to the telephoto end, spherical aberration of the lens system 1 of the present embodiment is also sufficiently suppressed to a range of ±0.03 mm or below, and in the lens system 1 that has a seven-lens construction, an extremely favorable aberration performance is achieved even though no aspherical lens is used. Accordingly, the lens system 1 of the present embodiment also has high telemetric characteristics on the image side and is suited to a digital camera in which an opto-electric converting element such as a CCD is used. The lens system 1 is also a lens system that corrects aberration extremely favorably and has a compact, low-cost construction of a total of seven lenses without using an aspherical lens.

It should be noted that although the present invention has been described referring to a zoom lens system, as shown above, a lens system of the invention has sufficient image forming performance as a short focus lens system at the respective focal distances within the zoom range. Therefore, the lens system of the present invention can be used as a short focus lens with a simple construction that does not include an aspherical lens.

Although the above lens systems have extremely favorable aberration performance without using an aspherical lens, any of the surfaces of any of the lenses can be made aspherical to further improve the aberration correction performance. Such a lens system has the demerits of aspherical surfaces described above, however, it is possible to provide a lens system with further improved image forming performance, so that it is possible to provide a digital camera with which images of higher resolution can be obtained.

Also, an application of the lens system according to the present invention is not limited to digital cameras that are usually used on their own, and the lens system can be applied to products in a wide range of fields, such as cameras incorporated in PDAs and mobile telephones, and cameras used to give vision to automatically and/or autonomously controlled apparatuses, such as robots.

What is claimed is:

1. A lens system comprising a first lens group with a negative refractive power, a second lens group with a positive refractive power, and a third lens group with a positive refractive power arranged in this order from an object side, wherein a focal length f2 of the second lens group, a focal length f3 of the third lens group and a radius of curvature Rm of an object side-surface of a lens that is closest to the object side in the second lens group satisfy following conditions $$0.30<Rm/f2<0.45$$

$$0.8<f2/f3<1.2.$$

2. A lens system according to claim 1, wherein the lens system is a zoom lens system where a spatial distance between the first lens group and the second lens group decreases and the spatial distance between the second lens group and the third lens group increases when the lens system is magnifying from a wide-angle end to a telephoto end.

3. A lens system according to claim 1, wherein the first lens group consists of three lenses, in order from the object side, a negative meniscus lens that is convex on the object side, a negative lens and a positive lens, the second lens group consists of three lenses, in order from the object side, a positive lens, a negative lens and a positive lens, and the third lens group consists of a single positive lens.

4. A lens system according to claim 3, wherein the negative lens and the positive lens of the first lens group form a cemented lens.

5. A camera comprising:

a lens system according to claim 1; and an opto-electric converting element for receiving an image formed by the lens system.

* * * * *